Feb. 1, 1949.  F. P. GOOCH  2,460,283
LUBRICATING SYSTEM FOR MOTORS
Filed May 16, 1946
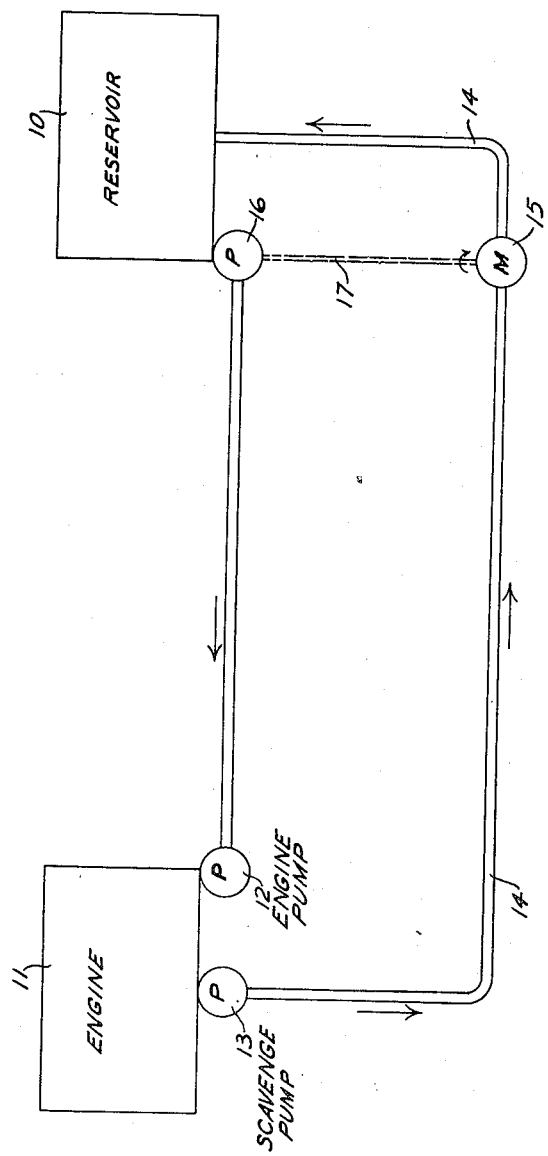
INVENTOR
FRED P. GOOCH
BY
Maurice A. Crews
ATTORNEY Patented Feb. 1, 1949

2,460,283

UNITED STATES PATENT OFFICE 2,460,283

LUBRICATING SYSTEM FOR MOTORS

Fred P. Gooch, Swarthmore, Pa., assignor to The Sharples Corporation, a corporation of Delaware Application May 16, 1946, Serial No. 670,246

3 Claims. (Cl. 184—6)

The present invention pertains to an improvement in impelling lubricant in a lubricant circulating system. It is particularly concerned with the problem of impelling oil from the oil reservoir to the engine in a lubricating system such as commonly used in aircraft, and will be described in relation to such an aircraft lubricating system.

In an arrangement commonly used for lubricating aircraft engines, one or more sump pumps (usually called scavenge pumps) are provided to maintain the engine sump in dry condition and impel oil from the crank case of the engine to a lubricant reservoir. Since the scavenge pumps must be built with large excess capacity in order to prevent accumulation of oil in the crank case, a large quantity of air is pumped into the lubricant reservoir along with the oil. A large part of this air is separated from the oil while the oil is in the lubricant reservoir, but some of this air remains entrained in the oil.

An engine-driven oil pressure pump (usually called the engine pump) is located at the engine to feed lubricant under pressure to the bearings. Oil is impelled from the lubricant reservoir to this pressure pump by a combination of gravity head and atmospheric pressure. The presence of air in this oil introduces problems, aggravated at high altitude, in supplying the oil from the reservoir to the pressure pump. The small bubbles of entrained air in the oil entering the conduit interconnecting the reservoir with the pressure pump become larger as they proceed through the conduit, for the absolute pressure decreases as a result of friction in the conduit. At high altitude, gravity head and atmospheric pressure may be inadequate to force sufficient oil to the pressure pump.

The reduced pressure at the inlet of the pressure pump, coupled with the presence of enlarged air bubbles, results in a reduction in the volume of oil this pump will handle. An increase in pressure at the pressure pump inlet will tend to restore the ability of the pressure pump to handle the proper volume of oil.

The primary object of the present invention is to provide an economical and effective arrangement by which oil is passed from the reservoir to the pressure pump under pressure in excess of atmospheric, and to accomplish this while maintaining the weight at a minimum without the necessity of use of electric motors or mechanism interconnected with the main engine.

The manner in which the invention is practiced in accordance with its preferred form will be evident from a reading of the following specification in the light of the attached drawing, in which, The single figure is a flow sheet illustrating the invention in a preferred embodiment.

As illustrated in the drawing, oil obtained from an oil reservoir 10 is forced to the bearings of the engine 11 by the conventional engine pump 12. Used lubricant is removed from the motor by the conventional scavenge pump 13 interconnected by conduit 14 to the reservoir 10.

These features of design are common in lubricating systems for aircraft and other vehicles and form no part of the present invention, which is concerned with the problem of more effective transfer of the oil from the reservoir 10 to the engine pump 12 and passage of this oil to the engine pump under superatmospheric pressure.

In accordance with the present invention, an hydraulic-type motor 15, which may be a motor of the turbine, vane, gear, roots, piston, or other type, is provided in the line of flow of oil from the scavenge pump 13 to the reservoir 10 through the conduit 14, and this motor drives a pump 16 which serves as a booster pump to assist in impelling oil from the reservoir 10 to the engine pump 12. The booster pump may be a pump of the same general type as the motor 15. A shaft 17 may, for example, be connected to a rotating part of the motor 15 and drive a rotating part of the pump 16. The pump 16 is preferably mounted at or closely adjacent to the reservoir 10, in order to minimize the difficulties involved in passage of oil from that reservoir to the pump 16.

From the above discussion, it will be seen that energy derived by the hydraulic motor 15 from passage of lubricant from the scavenge pump 13 to the reservoir 10 is used to drive the booster pump 16 and thus solve the problem heretofore encountered in delivering oil from the reservoir 10 to the engine pump 12.

Since various modifications are available within the scope of the invention, I do not wish to be limited except by the following claims.

I claim:

1. In a circulating lubricating system for engines, the combination comprising a lubricant reservoir, an engine, an engine pump for impelling lubricant under pressure to the engine bearings, a second pump for impelling lubricant from the engine to the reservoir, an hydraulic-type motor mounted in the line of flow of said lubricant from said second pump to said reservoir, a booster pump for impelling lubricant from said reservoir to said engine pump, and an operating connection between said hydraulic-type motor and said booster pump to drive said booster pump by energy derived by said hydraulic-type motor from passage of lubricant from said second pump to said reservoir.

2. In a circulating lubricating system for aircraft engines, the combination comprising a lubricant reservoir, an aircraft engine, an engine pump for impelling lubricant under pressure from the reservoir to the engine, a scavenge pump for impelling lubricant from the engine to the reservoir, an hydraulic-type motor mounted in the line of flow of said lubricant from said scavenge pump to said reservoir, a booster pump for impelling lubricant from said reservoir to said engine pump, and an operating connection between said hydraulic-type motor and said booster pump to drive said booster pump by energy derived by said hydraulic-type motor from passage of lubricant from said scavenge pump to said reservoir.

3. In a circulating lubricating system for engines, the combination comprising a lubricant reservoir, an engine, an engine pump for impelling lubricant under pressure from the reservoir to the engine, a scavenge pump for impelling lubricant from the engine to the reservoir, an hydraulic-type motor mounted in the line of flow of said lubricant from said scavenge pump to said reservoir, a booster pump adjacent said reservoir for impelling lubricant from said reservoir to said engine pump, and an operating connection between said hydraulic-type motor and said booster pump to drive said booster pump by energy derived by said hydraulic-type motor from passage of lubricant from said scavenge pump to said reservoir.

FRED P. GOOCH.

REFERENCES CITED

The following references are of record in the file of this patent:

UNITED STATES PATENTS

| Number | Name | Date |
|---|---|---|
| 2,268,653 | Flowers | Jan. 6, 1942 |

OTHER REFERENCES

Nallinger, Ser. No. 172,755 (filed Nov. 4, 1937), published May 18, 1943 by A. P. C.